US008958614B2

(12) United States Patent
Zhan et al.

(10) Patent No.: US 8,958,614 B2
(45) Date of Patent: Feb. 17, 2015

(54) IMAGE-BASED DETECTION USING HIERARCHICAL LEARNING

(75) Inventors: Yiqiang Zhan, West Chester, PA (US); Maneesh Dewan, Lafayette Hill, PA (US); Xiang Sean Zhou, Exton, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 123 days.

(21) Appl. No.: 13/553,860

(22) Filed: Jul. 20, 2012

(65) Prior Publication Data

US 2013/0136322 A1    May 30, 2013

Related U.S. Application Data

(60) Provisional application No. 61/563,943, filed on Nov. 28, 2011.

(51) Int. Cl.
*G06K 9/00* (2006.01)
*G06K 9/34* (2006.01)
*G06K 9/62* (2006.01)

(52) U.S. Cl.
USPC ........... 382/128; 382/159; 382/165; 382/170; 382/173; 382/224

(58) Field of Classification Search
CPC ............... G06T 2207/20081; G06T 7/0081; G06T 7/0012; G06T 2207/30004; G06T 7/0028; G06T 7/0087; G06T 7/0089; G06T 2207/20124; G06T 2207/30012; G06T 7/0032; G06T 7/2046; G06T 19/00; G06T 2200/04; G06T 7/0046; G06T 9/014; G06T 9/6207
USPC ......... 382/128–134, 165, 170, 205, 218, 224, 382/226–228
See application file for complete search history.

(56) References Cited

U.S. PATENT DOCUMENTS

| | | | |
|---|---|---|---|
| 2007/0081712 A1* | 4/2007 | Huang et al. | 382/128 |
| 2010/0080434 A1* | 4/2010 | Seifert et al. | 382/131 |
| 2010/0232686 A1* | 9/2010 | Dewan et al. | 382/159 |
| 2011/0058720 A1* | 3/2011 | Lu et al. | 382/131 |
| 2011/0064291 A1* | 3/2011 | Kelm et al. | 382/131 |
| 2012/0020538 A1* | 1/2012 | Weiss | 382/131 |

* cited by examiner

*Primary Examiner* — Amir Alavi
*Assistant Examiner* — Kenny Cese
(74) *Attorney, Agent, or Firm* — Peter R. Withstandley

(57) ABSTRACT

Systems and methods are provided for detecting anatomical components in images. In accordance with one implementation, at least one anchor landmark is detected in an image. The position of the anchor landmark is used to detect at least one bundle landmark in the image. In accordance with another implementation, at least two neighboring landmarks are detected in an image, and used to detect at least one anatomical primitive in the image.

18 Claims, 10 Drawing Sheets

IMAGE-BASED DETECTION USING HIERARCHICAL LEARNING

CROSS-REFERENCE TO RELATED APPLICATION

The present application claims the benefit of U.S. provisional application No. 61/563,943 filed Nov. 28, 2011, the entire contents of which are herein incorporated by reference.

TECHNICAL FIELD

The present disclosure relates to anatomy detection, and more particularly, to detection of anatomical components in digital images using hierarchical learning.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of the large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of the utmost importance to the doctor reaching an early diagnosis. Hence, there is a need for improving recognition techniques that provide accurate and fast recognition of anatomical structures and possible abnormalities in medical images.

One example of an anatomical structure that is often studied in medical images is the spine. Magnetic resonance imaging (MRI) is often used for spine imaging due to the high contrast between soft tissues. Digital images of the spine may be constructed by using raw image data obtained from an MRI scanner. Such digital images are typically either a two-dimensional ("2-D") image made of pixel elements or a three-dimensional ("3-D") image made of volume elements ("voxels").

In some spine imaging applications, 3-D scout scans are used to improve MR spinal analysis workflow, since they can provide isotropic resolutions with large fields of view covering the entire spine. Such 3-D scout scans are typically manually examined by technicians so as to label the vertebrae and identify imaging planes that are parallel to the inter-vertebral discs. Given the large amount of image data generated by any given image scan, however, such manual investigation can be tedious and prone to inaccuracy. It is therefore desirable to provide an automatic technique that detects anatomical features in the selected regions of an image for further diagnosis of any disease or condition, and to improve MR spine workflow.

SUMMARY

Described herein are systems and methods for detecting anatomical components in images. In accordance with one implementation, at least one anchor landmark is detected in an image. The position of the anchor landmark is used to detect at least one bundle landmark in the image. In accordance with another implementation, at least two neighboring landmarks are detected in an image, and used to detect at least one anatomical primitive in the image.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

Figure 1:
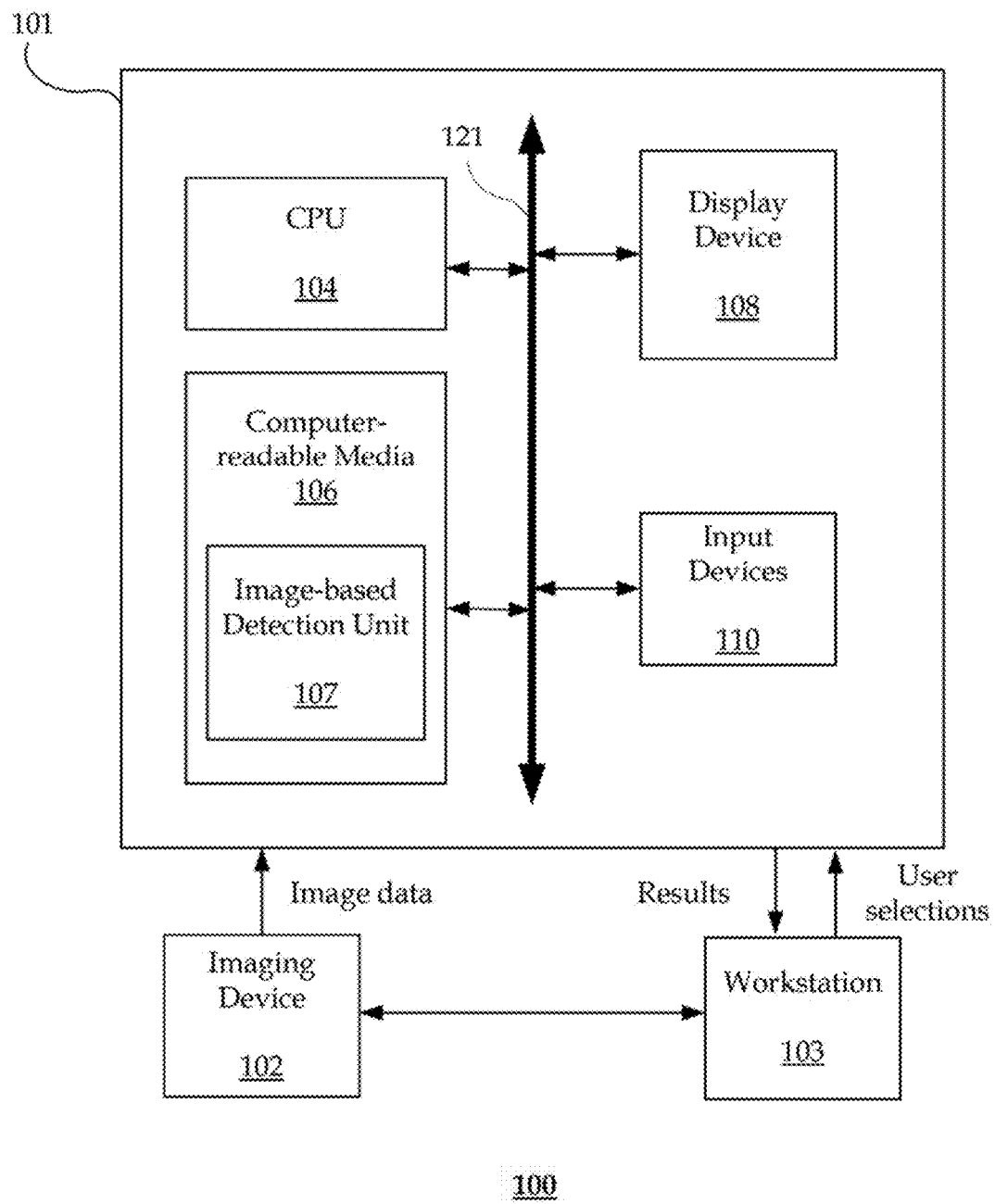
FIG. 1 is a block diagram illustrating an exemplary system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including but not limited to X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as; for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Further, as used herein, an "anatomical landmark" is an anatomical structure (e.g., vertebra) that is represented by a point (or voxel) in an image. An "anatomical primitive" is an anatomical structure (e.g., inter-vertebral disc) that is represented by more than one voxel in the image, such as a line (e.g., curve) or shape (e.g., plane, circle, disc, region, etc.) other than a point.

An anatomical landmark may be referred to as an "anchor landmark" or a "bundle landmark." An "anchor landmark" represents a specific anatomical structure (e.g., anchor vertebra) with a distinctive or discriminative characteristic (e.g., shape) that can be identified exclusively without reference to any other landmarks. Anchor landmarks may be used to identify or derive the labels of other anatomical landmarks or primitives. Examples of anchor landmarks include vertebrae C2, L5, S1, etc. A "bundle landmark" (e.g., bundle vertebra) represents an anatomical structure that is located within a bundle of anatomical structures with similar characteristics. For example, bundle landmarks representing vertebrae C3-C7 in the cervical section of the spine can be grouped in a "bundle" since they share similar shape characteristics. The characteristics (e.g., location, orientation, size, etc.) of a bundle landmark and an anatomical primitive may be predicted based on one or more other landmarks.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent in their performance.

The present framework relates to automated or semi-automated analysis of digital or digitized images. More particularly, a robust detection system is provided for localizing and labeling anatomical components in medical images. One exemplary application of the present framework relates to automated or semi-automated labeling of the spine that is robust to different kinds of diseases and imaging artifacts. For example, the present framework may analyze the entire spine, and automatically provide accurate numbering of all the discs and vertebrae of the spine. The entire spine can be correctly numbered despite the presence of abnormal spine geometry or imaging artifacts.

Another exemplary application relates to the selection of a scanning field or plane within a medical image for localizing an object of interest. The present framework may be used to automatically or semi-automatically provide accurate locations of anatomical components (e.g., vertebrae and inter-vertebral discs) for aligning the scanning plane. For instance, a selected inter-vertebral disc or vertebra may be used to align the scanning plane to maximize the diagnostic value and facilitate comparison with other studies. The scanning plane may be, for example, perpendicular to the axis of the targeted vertebra or inter-vertebral disc. The locations of the vertebra and/or disc may also be used to derive an optimal scanning orientation and extent. By automatically or semi-automatically selecting the scanning field, rather than having the field manually selected by a human operator, the process of acquiring a medical image may be sped up, made more reliable, and/or provide for a greater level of consistency and/or repeatability.

Such features also facilitate the reconstruction and reporting of spine images. Besides the improvement of MR spine workflow, the present framework also paves the way to various other spine applications. Exemplary use cases cover various image analysis areas, including vertebrae labeling in CT, MR and/or X-Ray images; Cobb's angle measurement in CT and/or MR images, quantitative measurements of spine geometry for scoliosis diagnosis, etc.

Previously, various methods have, been proposed to achieve automatic spine labeling. One type of method uses low-level appearance-based (e.g., pixel-level) features to detect vertebrae and lumbar discs. However, such methods are prone to producing erroneous labels due to similar local appearances between neighboring vertebrae/discs. The robustness of the vertebrae labeling can be improved by using the spatial correlation between different vertebrae, i.e., a global spine model. However, in disease cases, e.g., in scoliosis patients, a global spine model learned from normal cases often does not help but degrade the performance, because the spine geometry is quite different from a normal one. In the presence of severe imaging artifacts or spine diseases, which are typically more common in 3D MR scout scans, none of these prior methods seem capable of handling these cases robustly.

To improve the robustness of spine labeling, the present framework exploits two unique characteristics of spine anatomies that have often been ignored in previous work. First, although a spine appears to be composed of a set of repetitive components or structures (i.e., vertebrae and discs), these components have different distinctiveness, and hence provide different reliabilities in facilitating detection. To achieve greater robustness, different anatomies are treated differently in the present framework. Second, the spine is a non-rigid structure, where local articulations exist between the vertebrae and the discs. Such articulation can be quite large in the presence of certain spine diseases (e.g., scoliosis). An effective geometrical modeling should not consider vertebrae detections from scoliotic cases as errors just because of abnormal geometry.

Accordingly, instead of learning a general detector for the entire object of interest (e.g., spine), or treating the components thereof (e.g., vertebrae, discs) as completely independent entities, the present framework employs a hierarchical approach to learn different detectors, each dedicated to anchor landmarks (e.g., anchor vertebrae), bundle landmarks (e.g., bundle vertebrae) and anatomical primitives (e.g., intervertebral discs) respectively. These detectors are fused by a local articulation model, which models the spatial relations across landmarks and primitives, and propagates information between the different detectors in a way that is robust to abnormal spine geometry.

In one implementation, anchor landmarks are detected concurrently at run-time to provide redundant and distributed appearance cues that are robust to local imaging artifacts. These anchor landmarks may be used by bundle landmark detectors to provide candidates of bundle landmarks with subtle appearance differences. Additionally, locations of anatomical primitives may be derived from a cloud of responses from neighboring landmark detectors. With the use of such hierarchical learning of different detectors and local articulation model, the present framework has exhibited strong performance that is robust to sporadic voxel-level errors, particularly in cases with severe diseases (e.g., scoliosis) and imaging artifacts (e.g., metal artifacts in MR images). These and other exemplary advantages and features will be described in more detail in the following description.

It should be understood that while a particular application directed to detecting and labeling spinal structures may be shown, the technology is not limited to the specific embodiments or applications illustrated. The present framework also has application to, for example, other types of anatomical structures (e.g., ribs, aorta, smaller branches near the aorta, blood vessels, vascular system, airways, brain, colon, etc.) as well as abnormalities or diseases associated with such anatomical structures. In addition, thanks to its learning-based nature, the present framework may be extended to other imaging modalities by re-training the anatomy detectors. For example, the present framework may be applied to image data acquired by one or more different imaging modalities, including but not limited to, magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc.

FIG. 1 is a block diagram illustrating an exemplary system 100. The system 100 includes a computer system 101 for implementing the framework as described herein. Computer system 101 may be a desktop personal computer, a portable laptop computer, another portable device, a mini-computer, a mainframe computer, a server, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server, such as Syngo® via by Siemens Healthcare), a client user machine in server-client user network environment, or as a peer machine in a peer-to-peer (or distributed) network environment.

In one implementation, computer system 101 comprises a processor or central processing unit (CPU) 104 coupled to one or more non-transitory computer-readable media 106 (e.g., computer storage or memory), display device 108 (e.g., monitor) and various input devices 110 (e.g., mouse or keyboard) via an input-output interface 121. Computer system 101 may further include support circuits such as a cache, power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 106. In particular, the present techniques may be implemented by image-based detection unit 107. Non-transitory computer-readable media 106 may include random access memory (RAM), read only memory (ROM), magnetic floppy disk, flash memory, and other types of memories, or a combination thereof. The computer-readable program code is executed by CPU 104 to process images (e.g., MR or CT images) acquired by, for example, imaging device 102 (e.g., MR or CT scanner). As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 106 may be used for storing training datasets, visualization instructions, knowledge base, individual patient data, database of previously treated patients (e.g., training data), and so forth. Such data may also be stored in external storage or other memories. The external storage may be implemented using a database management system (DBMS) managed by the CPU 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 102 may be a radiology scanner, such as a magnetic resonance (MR) scanner or a CT scanner, for acquiring image data. The workstation 103 may include a computer and appropriate peripherals, such as a keyboard and display device, and can be operated in conjunction with the entire system 100. For example, the workstation 103 may communicate with the imaging device 102 so that the image data collected by the imaging device 102 can be rendered at the workstation 103 and viewed on a display device.

The workstation 103 may communicate directly with the computer system 101 to display processed image data and/or output image processing results (e.g., labeled images). The workstation 103 may include a graphical user interface to receive user input via an input device (e.g., keyboard, mouse, touch screen voice or video recognition interface, etc.) to manipulate visualization and/or processing of the image data. For example, the user may view the presented image data, and specify one or more view adjustments or preferences (e.g., zooming, panning, rotating, changing contrast, changing color, changing view angle, changing view depth, changing rendering or reconstruction technique, etc.), navigate to a particular region of interest by specifying a "goto" location, and so forth.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

As discussed previously, the present framework trains detectors targeted at different anatomies of an object of interest. The object of interest may be any anatomical structure identified for further study, such as the spine, aorta, smaller branches near the aorta, blood vessels, vascular system, airways, brain, colon, etc. In one implementation, the object of interest includes an anatomical structure with repetitive components (e.g., vertebrae and inter-vertebral discs).

Figure 2:
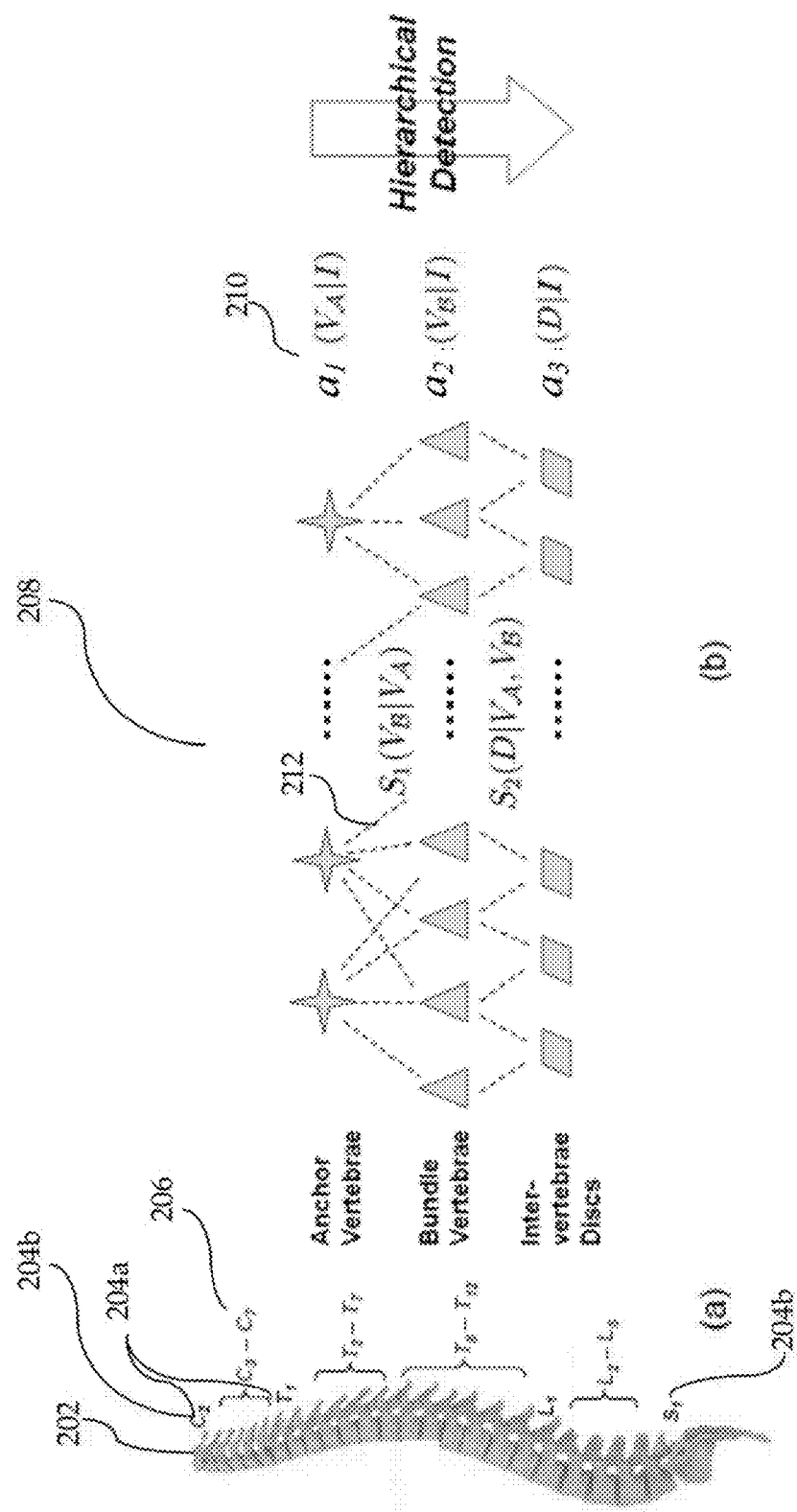
FIGS. 2(a) and (b) show schematic representations of a human spine and Equation 3 respectively.

FIG. 2a shows a schematic representation of a human spine 202. The human spine 202 typically includes 24 articulated vertebrae and a fused sacral vertebra (S1). The articulated vertebrae may be grouped into cervical (C1-C7), thoracic (T1-T12) and lumbar (L1-L5) sections. The vertebrae and inter-vertebral discs may be defined as $V=\{v_i|i=1,\ldots,N\}$ and $D=\{d_i|i=1,\ldots,(N-1)\}$ respectively, where $v_i$ is the i-th vertebra and $d_i$ is the inter-vertebral disc between the i-th and i+1-th vertebrae. It is worth noting that i may not be a simple index, but may relate to anatomical definition. Herein, without loss of generality, $v_i$ is indexed in the order of vertebrae from head to feet. For instance, $v_1$, $v_{24}$ and $v_{25}$ may represent C1, L5 and S1 vertebrae respectively.

Given an image I, the spine detection problem may be formulated as the maximization of a posterior probability with respect to V and D, as follows:

$$(V^*, D^*) = \underset{V,D}{\arg\max}\, P(V, D | I) \tag{1}$$

It may be observed that different vertebrae have different distinctiveness. A small number of vertebrae are much more distinguishable than others. For instance, the vertebrae 204a (e.g., C2 and T1) at the ends of a vertebral section 206 (e.g., C3-C7), or the vertebrae 204b (e.g., C2 and S1) at the extreme ends of the spine 202 are more distinguishable than others. These vertebrae 204a-b are herein referred to as "anchor vertebrae," and are represented by respective "anchor landmarks". The remaining vertebrae 206 (e.g., C3-C7, T2-T7, T8-T12, etc.) are grouped into different sets of continuous "bundles." The vertebrae in each bundle are herein referred to as "bundle vertebrae," and are represented by respective "bundle landmarks." Characteristics vary across different bundles, but are similar within a bundle. For instance, bundle vertebrae C3-C7 of the cervical section bundle appear similar, but are distinguishable from bundle vertebrae T8-T12 of the thoracic section bundle.

The posterior in Equation (1) may be rewritten and further expanded as follows:

$$P(V,D|I)=P(V_A,V_B,D|I)=P(V_A|I)\cdot P(V_B|V_A,I)\cdot P(D|V_A,V_B,I) \tag{2}$$

where $V_A$ and $V_B$ denote anchor and bundle vertebrae.

In one implementation, the Gibbs distribution is used to model the probabilities. It should be understood that other types of probability measures may also be employed. Using the Gibbs distribution, the logarithm of Equation (2) may be derived as follows:

$$\log[P(V, D | I)] = \tag{3}$$
$$a_1(V_A | I) \Leftarrow P(V_A | I) \Leftarrow P(V_B | V_A, I) + a_2(V_B | I) + S_1(V_B | V_A) \Leftarrow$$
$$P(D | V_A, V_B, I) + a_3(D | I) + S_2(D | V_A, V_B)$$

Herein, $a_1$, $a_2$ and $a_3$ represent the appearance characteristics of anchor vertebrae $V_A$, bundle vertebrae $V_B$ and inter-vertebral discs D respectively. $S_1$ and $S_2$ denote the spatial relations of anchor-bundle vertebrae and vertebrae-disc respectively. It is worth noting that the posterior of anchor vertebrae solely depends on the appearance term, while those of the bundle vertebrae and inter-vertebral discs depend on both the appearance term and spatial relations. In other words, while anchor vertebrae can be identified based on their distinctive appearances, bundle vertebrae and inter-vertebral discs are identified using both appearance characteristics and spatial relations to anchor or neighboring landmarks.

FIG. 2b shows a schematic representation 208 of Equation 3. In one implementation, the present framework includes multiple layers of appearance models targeting different anatomies of the object of interest. For instance, as shown in FIG. 2(b), three layers 210 of appearance models ($a_1$, $a_2$ and $a_3$) are constructed, each layer targeting the anchor vertebrae, bundle vertebrae and inter-vertebral discs respectively. The spatial relations 212 (denoted by broken lines) across the different anatomies "bridge" the different layers. The present framework is different from prior models that merely separate pixel- and object-level information. Instead, the multiple layers of the present framework target anatomies with different appearance distinctiveness.

Figure 3:
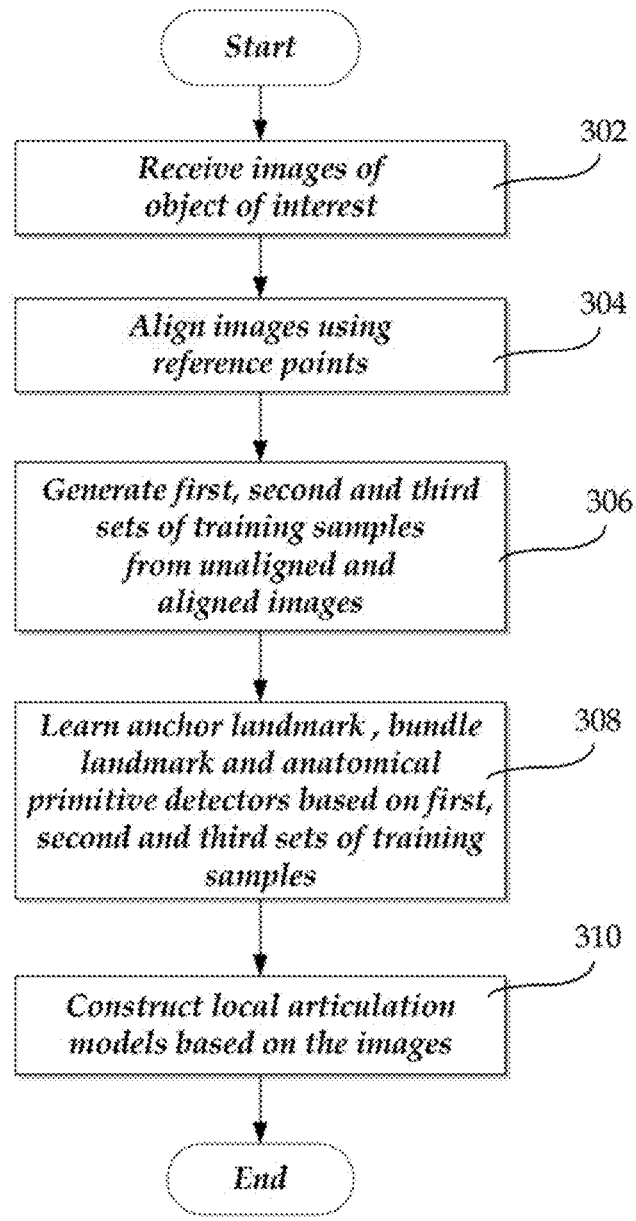
FIG. 3 shows an exemplary method for facilitating hierarchical learning.

FIG. 3 shows an exemplary method 300 for facilitating hierarchical learning for image-based detection from a computer system. Machine learning technologies may be used to model the appearance characteristics of the anatomical landmarks or primitives in the images. However, unlike prior work, instead of treating anatomical landmarks or primitives equivalently, different training strategies are applied based on their different appearance characteristics. It should be understood that the steps of the method 300 may be performed in the order shown or a different order. Additional, different, or fewer steps may be provided. Further, the method 300 may be implemented with the system 100 of FIG. 1, a different system, or a combination thereof.

At 302, images of the object of interest are received. The images may be medical images (e.g., MR, CT, PET, etc.) containing anatomical landmarks and/or primitives of interest. Such anatomical landmarks and/or primitives may be manually identified and labeled (or annotated) in the images by, for example, a radiologist or any other skilled person.

At 304, the images are aligned using reference points. The reference points may be anchor landmarks or neighboring landmarks. To train a bundle landmark detector, the images may be aligned by anchor landmarks. The images may also be aligned by neighboring landmarks to train an anatomical primitive detector. For instance, an inter-vertebral disc detector may be trained based on samples extracted from images aligned by two neighboring vertebrae. Different methods may be used to align the images. In one implementation, image alignment is performed by a rigid transformation based on anchor or neighboring landmarks. The purpose of this image alignment is to remove appearance variations resulting from different poses or orientations of the anatomical structures.

At 306, first, second and third sets of training samples are generated from the unaligned and/or aligned images. The first, second and third sets of training samples may be used to train anchor landmark, bundle landmark and anatomical primitive detectors respectively. Additional sets of training samples may also be generated for training additional detectors.

In one implementation, the first set of training samples are extracted from images that did not undergo any image alignment. Since the anchor landmark detector should be trained in a very discriminative way and produce high responses around the center of the specific anchor landmark, the first set of positive training samples may be extracted by cropping the images so as to include only voxels (or pixels) close to the center of the associated anchor landmark. Negative samples may be extracted by sampling the remaining voxels (or pixels) of the entire image volumes (or areas) not containing the anchor landmark.

The second set of training samples may be extracted from images that have been aligned by anchor landmarks. They are used to train a bundle landmark detector. Positive samples may be extracted by sampling voxels close to a center point of any bundle landmarks within the bundle associated with the bundle landmark detector. The remaining voxels in the local volume of the images containing landmarks of neighboring bundles may be sampled to serve as negative samples.

This method of selecting positive and negative samples in the second set for training the bundle landmark detector is based on the observation that bundle landmarks look similar to their neighbors, but different from remote ones. On one hand, a general detector for all bundle landmarks may be infeasible due to the large variations across distal ones. On the other hand, an attempt to learn the subtle differences between a bundle landmark and its neighborhoods may adversely affect its robustness.

Figure 4:
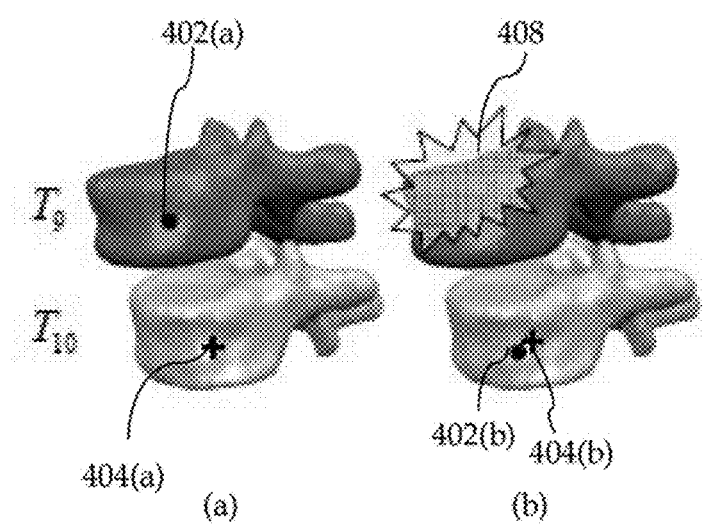
FIGS. 4(a) and (b) show the ideal result and potential errors that may arise by using specific detectors for neighboring bundle vertebrae, respectively.

FIG. 4a shows the ideal responses and FIG. 4b illustrates the potential errors that may arise by using specific detectors for neighboring bundle vertebrae. In this situation, two specific detectors are trained to subtly differentiate vertebrae T9 and T10. The symbols "●" (402(a)-(b)) and "+" (404(a)-(b)) denote the highest responses of the T9 and T10 detectors, respectively. Ideally, as shown in FIG. 4a, the respective detectors should generate the highest responses 402(a) and 404(a) at the corresponding vertebrae T9 and T10. However, when local imaging artifacts 408 appear around vertebra T9, as shown in FIG. 4b, the T9 detector erroneously produced the highest response 404(b) at T10, since T10 is more salient than T9. This problem may also be observed in prior methods that use standard iterative marginal space learning to generate candidates. See, for example, Kelm, M., Zhou, S., Shling, M., Zheng, Y., Wels, M., Comaniciu, D., "Detection of 3d spinal geometry using iterated marginal space learning," In: MCV. (2010) 96-105 (hereinafter "Kelm et. al"), which is herein incorporated by reference.

To avoid this problem, the present framework employs a strategy in the middle of "one general detector for all" and "specific detectors for each." More particularly, landmarks are grouped into one or more "bundles." Landmarks within the same bundle are treated as equivalent positives in the learning framework. Each bundle has one detector that learns the commonality of corresponding bundle landmarks and distinguishes them from other bundles.

Referring back to FIG. 3, at 306, the third set of training samples may be generated from images that have been aligned by neighboring landmarks for training an anatomical primitive detector. In one implementation, the third set of training samples contains positive samples that are extracted by sampling voxels located within a specific anatomical primitive. Each voxel within the given anatomical primitive may be treated as an independent positive sample for training the associated anatomical primitive detector. Negative samples in the third set of training data may be obtained by sampling the remaining voxels in the local volume image containing neighboring structures.

Unlike Kelm et al., which learns and detects a disc as a whole, the present framework treats each voxel on primitive anatomical primitive as an individual sample. Locations of the anatomical primitive may be derived by fitting disc response maps with, for example, principal component analysis, active contours, or any other suitable methods. The anatomical primitive detector is expected to return a high response at any voxel located within its associated anatomical primitive. In this way, anatomical primitive detection becomes more robust to sporadic classification errors at voxel-level. Since voxels within the same anatomical primitive are almost indistinguishable, similar to bundle landmarks, all the voxels are "bundled" in the training stage.

In summary, different sets of training data may be extracted for respective detectors targeted at different anatomies. Table 1 shows an exemplary training scheme for detectors of anchor vertebrae, bundle vertebrae and inter-vertebral discs in accordance with one implementation.

TABLE 1

| Detector | Positive Samples | Negative Samples | Image Alignment |
|---|---|---|---|
| Anchor vertebrae | Voxels close to center of specific vertebrae | Remaining voxels in the entire volume image | No alignment |

TABLE 1-continued

| Detector | Positive Samples | Negative Samples | Image Alignment |
|---|---|---|---|
| Bundle vertebrae | Voxels close to the centers of any vertebrae within the bundle | Remaining voxels in the local volume image covering neighboring bundles | Aligned by anchor vertebrae |
| Inter-vertebral discs | Voxels located on the disc | Remaining voxels in the local volume image covering the two neighboring vertebrae | Aligned by two neighboring vertebrae |

As shown in Table 1, from anchor vertebrae to inter-vertebral discs, the targeted anatomies become less and less distinctive (i.e. more positive samples are extracted from each training image). On the other hand, image alignment becomes more and more sophisticated and positive/negative samples are selected from a more and more local region. In this way, the variations of the training samples are well constrained, such that the anatomy detection remains a learnable machine-learning problem.

At 308, detectors are trained for detecting anchor landmarks, bundle landmarks and anatomical primitives based on the first, second and third sets of training samples respectively. The detectors target different anatomies and may be learned using the same features and machine learning technologies.

In accordance with one implementation, feature extraction is performed only after image alignment (step 304) and the selection of training samples (step 306). Detectors for anchor landmarks, bundle landmarks and anatomical primitives may be trained as $A_i(\mathcal{F}(p))$, $B_j(\mathcal{F}(p))$, and $D_k(\mathcal{F}(p))$, where $\mathcal{F}(p)$ denotes a set of features (e.g., over-complete Haar wavelets, local binary pattern, histogram of oriented gradients, Gabor wavelets, etc.) extracted around voxel p. $A_i$, $B_j$ and $D_k$ represent the trained classifiers (e.g., Adaboost, support vector machine, relevance vector machine, etc.). The trained classifiers select and combine a small proportion of the feature set $\mathcal{F}(p)$ to achieve best anatomy detection. Output of these classifiers (or detectors) $A_i$, $B_j$, and $D_k$ represents the likelihood of a voxel p belonging to an anchor landmark, bundle landmark and anatomical primitive respectively.

The appearance terms in the aforementioned Equation (3) may then be concretized as follows:

$$a_1(V_A|I) = \Sigma_{v_j \in V_A} A_i(\mathcal{F}(v_j)) \quad (4)$$

$$a_2(V_B|I) = \Sigma_{v_j \in V_B} B_j(\mathcal{F}(v_j)) \quad (5)$$

$$a_3(D|I) = \Sigma_{d_k \in D} \Sigma_{p \in d_k} D_k(\mathcal{F}(p)) \quad (6)$$

At 310, local articulation models are constructed based on the images. The local articulation models are used to describe the spatial relations across the landmarks and/or primitives in the images. More particularly, a local articulation model represents the relative transformation between local neighboring components. For example, as previously defined in Equation (3), the spatial relations between anchor-bundle vertebrae and vertebrae-discs are modeled by $S_1(V_B|V_A)$ and $S_2(D|V_A, V_B)$ respectively. The spine is a flexible structure where each vertebra has the freedom of local articulation. The local rigid transformation can be quite large in the presence of certain spine diseases (e.g., scoliosis). As classic shape/geometry modeling methods treat the object as a whole, they cannot effectively model these local variations of the spine geometry. See, for example, Cootes, T., Taylor, C. J., Cooper, D. H., Graham, J., "Active shape models-their training and application," CVIU 61(1), 38-59, 1995, which is herein incorporated by reference. The present framework treats the entire articulation model as a set of local articulation models of the neighboring vertebrae. During run-time detection, these local articulation models are used in a flexible way. The local articulation models may be used to predict position of unlabeled landmarks by guiding bundle landmark and anatomical primitive detectors.

Figure 5:
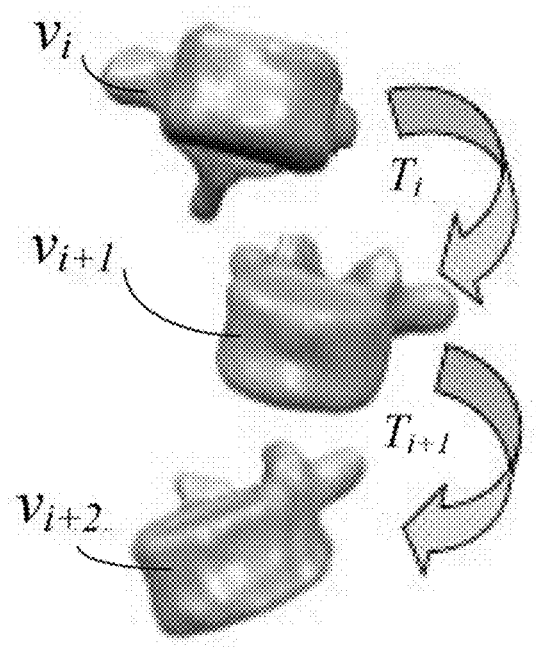
FIG. 5 shows an exemplary local articulation model.

FIG. 5 illustrates an exemplary local articulation model that may be used to model spatial relations across vertebrae. Assume that $v_i$ is an anchor vertebra and $\{v_{i+1}, \ldots, v_{i+M}\}$ are subsequent bundle vertebrae. As shown in FIG. 5, the spatial relations between the anchor and bundle vertebrae are modeled as $[T_i, T_i \cdot T_{i+1}, \ldots, T_i \cdot T_{i+1} \cdot \ldots \cdot T_{i+M-1}]$, where $T_i$ defines a local similarity transformation between $v_i$ and $v_{i+1}$.

In one implementation, the spatial relation $S_1(V_B|V_A)$ between anchor-bundle vertebrae is defined as follows:

$$S_1(V_B | V_A) = \sum_i e^{-(\psi(T_i) - \mu_{T_i})^T \Xi_{T_i} (\psi(T_i) - \mu_{T_i})} + 2 / \left(1 + e^{\gamma \|\psi(T_i) - \psi(T_{i+1})\|^2}\right) \quad (7)$$

Here, $\psi(\cdot)$ is an operator that converts the local transformation $T_i$ to a vector space. In other words, the rotation part of the local transformation $T_i$ is converted to its quarternion. The terms $\mu_{T_i}$ and $\Xi_{T_i}$ are the Frechet mean and generalized covariance of the local transformation $T_i$. See, for example, Biosvert, J., Cheriet, F., Pennec, X., Labelle, H., Ayache, N., "Geometric variability of the scoliotic spine using statistics on articulated shape models," IEEE Trans. Med. Imaging 27 (2008), 557-568, which is herein incorporated by reference. The first term in Equation (7) contains the prior information of local transformations across the population. The second term in Equation (7) evaluates the difference between the local transformation $T_i$ across the same spine. These two terms complement each other, such that a scoliotic spine still gets a high value of $S_1$, due to the continuity of its local transformations.

In one implementation, the spatial relation between vertebrae and discs, $S_2(D|V_A, V_B)$, is modeled using two assumptions: 1) A vertebral disc is roughly perpendicular to the line connecting its neighboring vertebrae centers; and 2) Center of an inter-vertebral disc is close to the mid-point of the two neighboring vertebrae centers. Accordingly, $S_2(D|V_A, V_B)$ may be defined as follows:

$$S_2(D | V_A, V_B) = \sum_i \left[ e^{-(1 - U(v_i - v_{i+1}) \cdot N_{d_i})^2 - \lambda_1^2} + e^{-\|(\frac{v_i + v_{i+1}}{2}) - C_{d_i}\|^2 / \lambda_2^2} \right] \quad (8)$$

where $v_i$ and $v_{i+1}$ denote the centers of the two neighboring vertebrae of disc $d_i$, whose center and norm are $N_{d_i}$ and $C_{d_i}$. $U(\cdot)$ denotes the normalization operator.

A detection framework in accordance with one implementation of the present framework uses a multi-stage algorithm to optimize the high-dimensional and non-linear function previously defined by Equation (3). Different stages target different anatomies (e.g., anchor vertebrae, bundle vertebrae, inter-vertebral discs). In one implementation, the appearance terms and spatial terms are alternatively optimized in each stage, as will be described in more details later.

FIG. 2b provides a more schematic explanation of the optimization procedure in accordance with one implementation. Detections may be performed top-down to provide appearance cues in a "global and distinctive" to "local and uncharacteristic" fashion. The spatial terms $S_1$ and $S_2$ bridge different levels of the hierarchy and propagate appearance cues among them.

Such hierarchical scheme emulates a radiologist's inspection and guarantees robustness in at least three aspects: 1) anchor vertebrae are detected concurrently to provide redundant and distributed appearance cues. Even when severe imaging artifacts make certain anchor vertebrae invisible, others still provide reliable cues for spine detection. 2) Detectors of bundle vertebrae and discs provide support cues with proper discrimination. More specifically, instead of trying to directly derive vertebrae labels, bundle vertebrae detectors provide a set of candidates whose labels are mutually assigned according to relative positions to anchor vertebrae. Note that labels assigned by different anchor vertebrae may be different. The resulting labels are "fused" by maximizing the spatial term $S_1$. Wrong labels resulting from local artifacts (e.g., as shown in FIG. 3) may then be avoided. Disc detectors return a cloud of responses for disc localization, which is also robust to individual false classifications. 3) Local articulation model propagates the appearance cues in a way that is robust to abnormal spine geometry that result from severe diseases.

Figure 6:
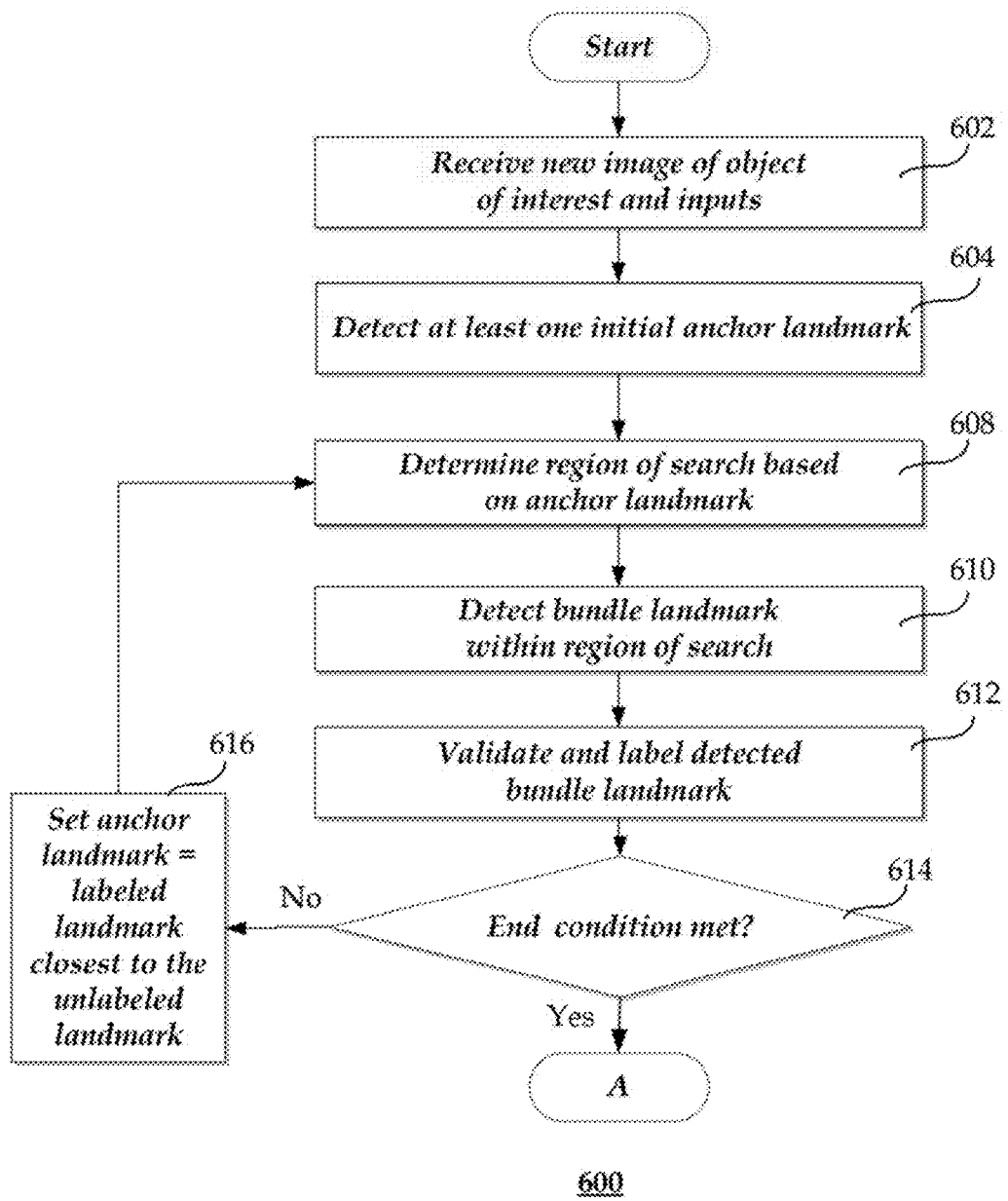
FIG. 6 shows an exemplary method of detecting landmarks.

FIG. 6 shows an exemplary method of detecting anatomical landmarks in an image. It should be understood that the steps of the method 600 may be performed in the order shown or a different order. Additional, different, or fewer steps may be provided. Further, the method 600 may be implemented with the system 100 of FIG. 1, a different system, or a combination thereof. The same or different systems may perform the various steps of method 300 of FIG. 3 and method 600 of FIG. 6. For example, one computer system may be used for performing hierarchical learning, while a different computer system may be used for automatically detecting, localizing and/or labeling anatomical landmarks in a given image at run-time.

At 602, a new image and inputs are received. Given a new image of any modality, one can run the present system to automatically detect, localize and/or label any landmark in the new image whose detector (or classifier) has been previously trained using training samples extracted from images of the same modality. The inputs may be one or more detectors and local articulation models generated using, for example, the training method 300 previously described with reference to FIG. 3.

At 604, at least one initial anchor landmark is detected in the new image. As discussed previously, the anchor landmark may represent a very distinctive shape that is more distinguishable than those represented by other landmarks. The anchor landmark may be used to facilitate the detection of bundle landmarks and/or anatomical primitives. In one implementation, the anchor landmark is represented by a center point of a vertebra, a center point of an inter-vertebral disc, a point at the rib-vertebra junction, a point along the center line of a rib or a spinal cord, or any other suitable location.

To detect the anchor landmark, a trained anchor landmark detector may be applied. Alternatively, the anchor landmark may be manually identified. The anchor landmark detector may be trained in accordance with the method 300, as previously described with reference to FIG. 3. All the anchor landmarks in the image may be concurrently detected by the anchor landmark detector. Such detection process is equivalent to maximizing the appearance term $a_1$ (see Equation 3).

At 608, a region of search is determined to guide the detection of the bundle landmark. The region of search may be estimated based on the position of the anchor landmark. In one implementation, the region of search is heuristically defined at a pre-determined offset from the position of the anchor landmark. The region of search may be defined by, for example, a square, cube, sphere, or any other shape, centered at the anchor landmark.

In another implementation, the region of search is defined by using a local articulation model. The local articulation model may be adapted based at least in part on the anchor landmark. In one implementation, the scale and orientation of the local articulation model is adapted according to the anchor landmark. This may be performed by performing a similarity transformation to bring the articulation model to the image space of the anchor landmark. The adapted local articulation model may then be used to predict positions of unlabeled bundle landmarks. This is equivalent to maximizing the spatial term $S_1$ (see Equation 7). The predicted positions indicate the local regions of search where the bundle landmark detectors will be invoked to maximize the appearance term $a_2$ (see Equation 3).

At 610, a bundle landmark detector is applied within the region of search to detect bundle landmarks. A bundle landmark may be represented by a center point of a vertebra, an inter-vertebral disc, or any other suitable location. The bundle landmark detector is used to search through the local region of search to classify each voxel to be either a positive example that is within the detector's bundle or a negative example that is not within the detector's bundle (e.g., belongs to a neighboring bundle or does not belong to any landmark). The response output by the bundle landmark detector indicates the likelihood of a given voxel belonging to the detector's associated bundle.

At 612, the detected bundle landmarks are validated and labeled using, for example, the local articulation model. At this stage, the spatial term $S_1$ is further maximized using the responses of the bundle landmark detectors. False positive responses may be pruned, and labels of bundle landmarks may be derived using, for example, the local articulation model. The bundle landmarks may be labeled according to a standard naming convention. For example, in the case of spine labeling, the bundle landmarks may be labeled and/or numbered as cervical (C1-C7), thoracic (T1-T12) or lumbar (L1-L5) vertebrae.

At 614, the system checks to see if the end condition is met. The end condition may be defined as, for example, when all landmarks have been detected and/or labeled. If the end condition has not been satisfied, the process continues at 616, where the anchor landmark is updated to guide the next round of detection. In one implementation, the anchor landmark is set to the labeled landmark closest to the unlabeled landmark. The updated anchor landmark is then used to determine the region of search at 608, and the process continues by repeating steps 610-614.

Figure 7:
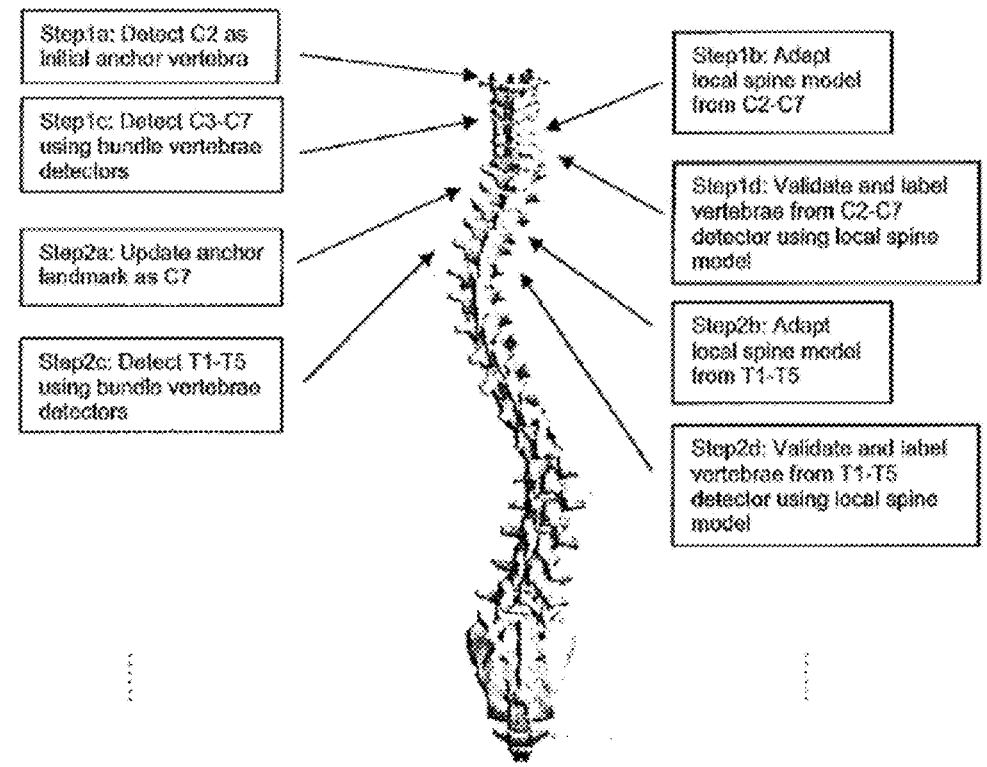
FIG. 7 shows a schematic representation of an exemplary spine labeling method.

FIG. 7 shows a schematic representation of an exemplary spine labeling method 700 in accordance with one implementation. At step 1a, the vertebra C2 may first be detected as an initial anchor vertebra. At step 1b, the local spine model from the bundle vertebrae C2-C7 may be adapted to the anchor vertebra C2. At step 1c, bundle vertebrae C3-C7 may then be detected using the bundle vertebrae detector. At step 1d, bundle vertebrae C2-C7 are validated and labeled using the local spine model.

The process then continues to detect and label subsequent neighboring bundle vertebrae. For example, at step 2a, the anchor landmark is set as vertebra C7. At step 2b, the local spine model is then adapted from bundle vertebrae T1-T5. At step 2c, bundle vertebrae T1-T5 are detected using the bundle vertebrae detectors. At step 2d, the bundle vertebrae T1-T5 are validated and labeled using the local spine model.

Figure 8:
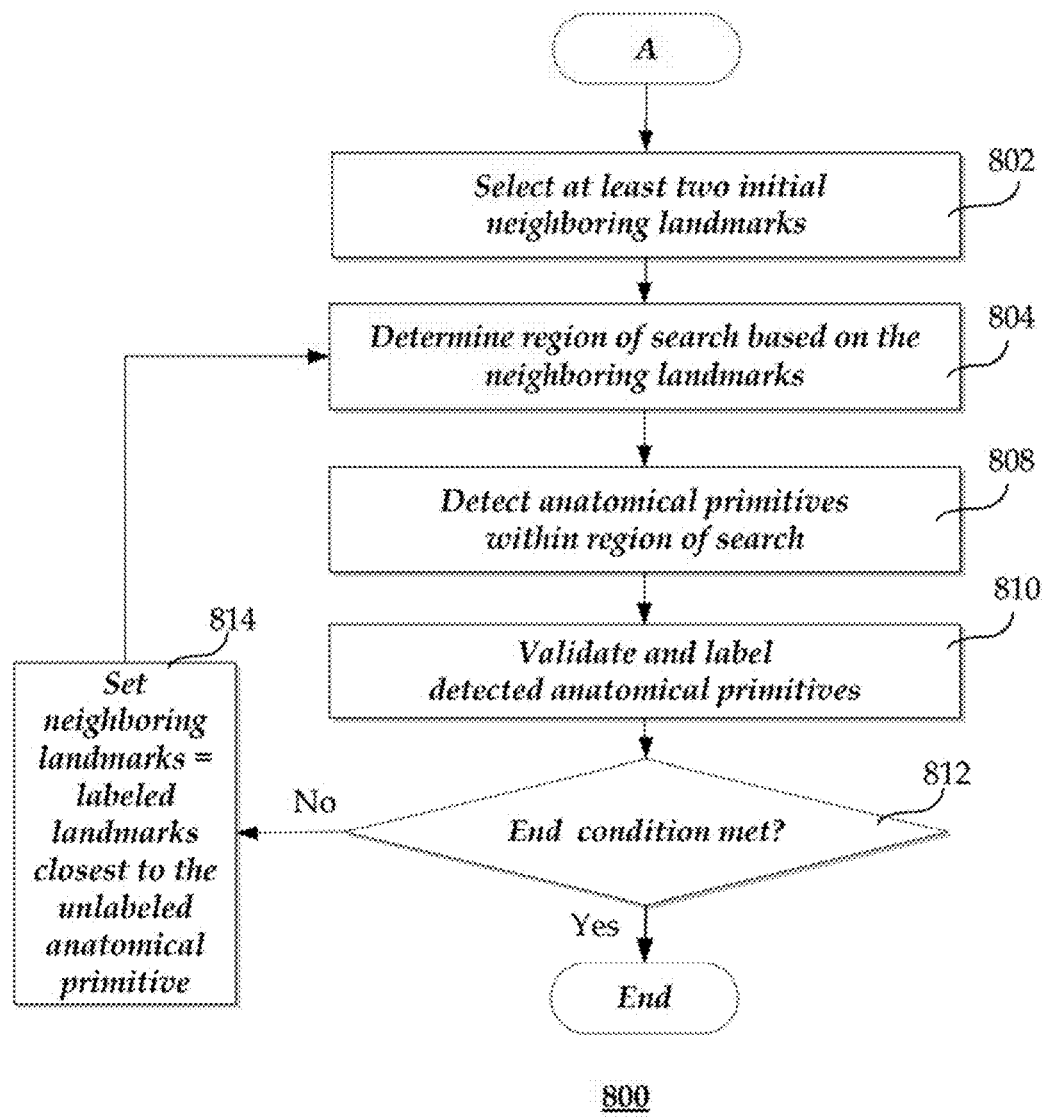
FIG. 8 shows an exemplary method of detecting landmarks.

In accordance with one implementation, after all the bundle landmarks in the image have been detected, the system continues to detect anatomical primitives. FIG. 8 shows an exemplary method 800 of detecting anatomical primitives in an image.

At 802, at least two neighboring landmarks may be selected as the initial neighboring landmarks. These neighboring landmarks may be located next to each other or the unlabeled anatomical primitive. They may include landmarks found in the same bundle and/or anchor landmarks that have already been detected by the aforementioned steps of method 600.

At 804, a region of search is determined to guide the detection of the anatomical primitive. The region of search may be determined based on the neighboring landmarks. In one implementation, a local region of search (e.g., square, cube, sphere, etc.) is heuristically defined based on a relationship of the neighboring landmarks, such as the mid-point of neighboring landmarks.

Alternatively, the region of search is defined using a local articulation model. In one implementation, the local articulation model is adapted based at least in part on the neighboring landmarks. For example, the scale and orientation of the local articulation model may be updated according to the neighboring landmarks. This may be performed by performing a similarity transformation to bring the articulation model to the image space of the neighboring landmarks. Positions of unlabeled anatomical primitives may then be predicted by using the adapted local articulation model. This is equivalent to maximizing the spatial term $S_2$ (see Equation 8). The predicted positions indicate the local regions of search where the anatomical primitive detectors will be invoked to maximize the appearance term $a_3$ (see Equation 3). The adapted local articulation model may also be used to predict the orientation, size and other spatial characteristics of the anatomical primitives.

At 808, an anatomical primitive detector is applied within the region of search to detect at least one anatomical primitive. In one implementation, the anatomical primitive detector scans the local region of search to classify each voxel as either a positive example that is located within the anatomical primitive, or a negative example that is located outside the anatomical primitive. The response output by the primitive detector represents the likelihood of a given voxel being located within the detector's anatomical primitive.

At 810, the detected anatomical primitive is validated and labeled using the local articulation model. This stage may involve maximizing the spatial term $S_2$ by using the responses of the anatomical primitive detector. False positive responses may then be pruned, and labels of anatomical primitives may be derived using, for example, the local articulation model. The anatomical primitives may be labeled in accordance with a standard naming convention.

At 812, the system checks to see if the end condition is satisfied. For example, if all the anatomical primitives have been detected and/or labeled, the process 800 ends. If not, the process continues at 814 by updating the neighboring landmarks to guide the next round of detection. This may be achieved by setting the neighboring landmarks to those landmarks found closest to the unlabeled anatomical primitive. The process then continues by using the updated neighboring landmarks to determine the region of search at 804, and repeating the aforementioned steps 808-812.

The present framework has been validated by datasets of MR spine scout scans, and has exhibited robust performance, especially in cases with severe diseases and imaging artifacts. The experimental data includes 405 LSpine, CSpine and WholeSpine scout scans (105 for training and 300 for testing) with isotropic resolution 1.7 mm. These datasets came from different clinical sites, and were generated by different types of Siemens MR Scanners (e.g., Avanto 1.5T, Skyra 3T, etc.). Quantitative evaluation is carried out on 355 discs and 340 vertebrae from 15 WholeSpine scans. The average translation errors of discs and vertebrae are 1.91 mm and 3.07 mm. The average rotation error of discs is 2.33°.

Figure 9:
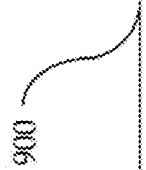
FIG. 9 shows a table containing the results of an evaluation.

FIG. 9 depicts a table 900 containing the results of a larger scale evaluation performed on 300 scans (80 CSpine, 100 LSpine and 120 WholeSpine). Three experienced radiologists rated the spine detection results as "perfect" (i.e. no manual editing required), "acceptable" (i.e. minor manual editing required) and "rejected" (i.e. major manual editing required). For comparison, results from two adapted versions of the present proposed method are evaluated—Method1: without hierarchical learning; and Method2: without local articulation model.

Figure 10:
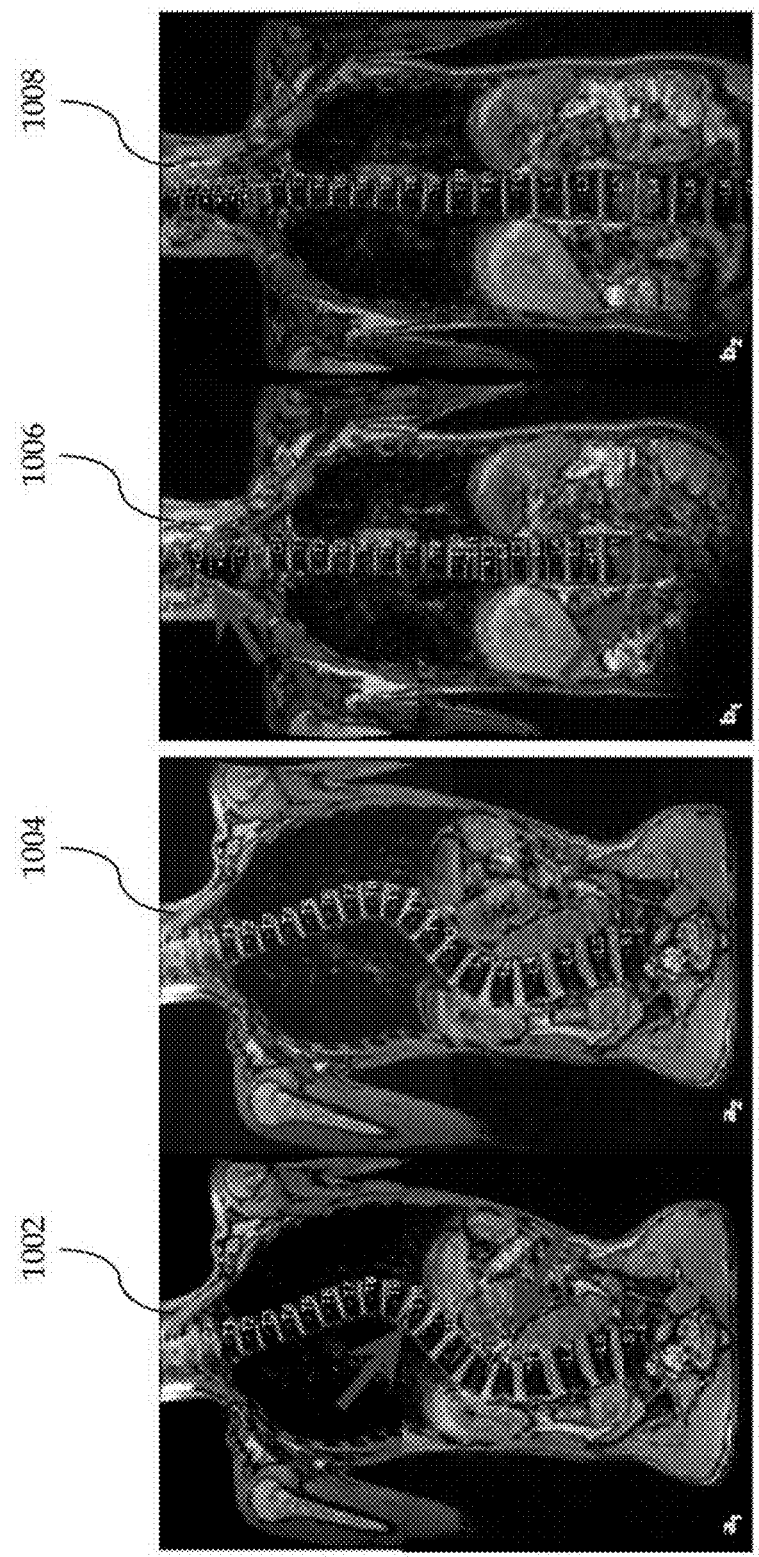
FIG. 10 shows examples of experimental results.

As shown in table 900, the proposed method generates "perfect" results in more than 97% of the cases, which is significantly better than the other methods. FIG. 10 shows two examples of such results. Curved coronal multi-planar reconstructions (MPRs) are shown to better illustrate the comparisons between the different spine detection methods. Images 1002 and 1004 show a scoliotic case using Method2 and the proposed method respectively. Images 1006 and 1008 show an artifact case using Method1 and the proposed method respectively.

In general, Method2 is better than Method1, since the lack of articulation model mainly affects cases with abnormal spine geometry (e.g., scoliosis), which has a small proportion in the datasets. Another interesting observation is that Method1 has a larger impact on CSpine than LSpine images, but Method2 is the other way around. This phenomenon in fact results from the different sizes of cervical and lumbar vertebrae. Due to the smaller size of cervical vertebrae CSpine, it is prone to erroneous detection using non-hierarchical detectors. On the other hand, the larger size of lumbar vertebrae LSpine makes the detection more sensitive to abnormal spine geometry, which can only be tacked with the local articulated model.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:
1. A method of detecting anatomical components in images, comprising:
 (i) receiving a medical image;
 (ii) detecting at least one anchor landmark in the image by applying an anchor landmark detector that is learned from a first set of training samples;
 (iii) detecting, by a processor, at least one bundle landmark in the image based at least in part on a position of the anchor landmark, wherein the bundle landmark is detected by applying a bundle landmark detector that is learned from a second set of training samples including positive and negative samples, wherein the positive samples include voxels close to any bundle landmark within a bundle of anatomical structures that are grouped based on similar characteristics and are associated with the bundle landmark detector, wherein the negative samples include remaining voxels in a local volume containing landmarks of one or more neighboring bundles; and (iv) detecting, by the processor, at least one anatomical primitive based at least in part on at least two neighboring landmarks by applying an anatomical primitive detector that is learned from a third set of training samples, wherein the third set of training samples includes positive samples extracted by sampling voxels located within a specific anatomical primitive and a voxel within the specific anatomical primitive is treated as an independent positive sample.

2. The method of claim 1 wherein the anchor landmark and the bundle landmark represent vertebrae.

3. The method of claim 1 wherein the anchor landmark and the bundle landmark represent inter-vertebral discs.

4. The method of claim 1 further comprising:
aligning a set of images; and
extracting the second set of training samples from the aligned images.

5. The method of claim 4 further comprising:
extracting, from the aligned images, the positive samples by sampling voxels close to any bundle landmark within the bundle associated with the bundle landmark detector; and
extracting, from the aligned images, the negative samples by sampling the remaining voxels in the local volume containing the landmarks of the one or more neighboring bundles.

6. The method of claim 1 wherein detecting the bundle landmark comprises:
determining a first region of search based on the anchor landmark; and
applying the bundle landmark detector within the first region of search to detect the bundle landmark.

7. The method of claim 6 wherein determining the region of search comprises:
adapting a first local articulation model based at least in part on the anchor landmark; and
determining the first region of search using the adapted first local articulation model.

8. The method of claim 7 further comprising validating and labeling the detected bundle landmark using the first local articulation model.

9. The method of claim 1 wherein the anatomical primitive represents an inter-vertebral disc.

10. The method of claim 1 wherein detecting the anatomical primitive comprises:
determining a second region of search based on the neighboring landmarks; and
applying an anatomical primitive detector within the second region of search.

11. The method of claim 10 wherein determining the second region of search comprises:
adapting a second local articulation model based at least in part on the neighboring landmarks; and
determining the second region of search using the adapted second local articulation model.

12. The method of claim 11 further comprising validating and labeling the detected anatomical primitive using the second local articulation model.

13. The method of claim 1 wherein the third set of training samples includes negative samples obtained by sampling remaining voxels in a local volume containing neighboring structures.

14. The method of claim 13 wherein the anchor landmark is detected by applying an anchor landmark detector that is learned from a first set of training samples.

15. The method of claim 13 wherein the bundle landmark is detected by applying a bundle landmark detector that is learned from a second set of training samples.

16. A method of detecting anatomical components in images, comprising:
(i) receiving a medical image;
(ii) detecting at least two neighboring landmarks grouped in a same bundle with similar characteristics in the image; and
(iii) determining a region of search using a local articulation model adapted based at least in part on the neighboring landmarks; and
(iv) detecting, by a processor, at least one anatomical primitive in the image by applying an anatomical primitive detector within the region of search by applying an anatomical primitive detector that is learned from a set of training samples that includes positive samples extracted by sampling voxels located within a specific anatomical primitive and treating a voxel within the specific anatomical primitive as an independent positive sample.

17. A non-transitory computer readable medium embodying a program of instructions executable by machine to perform steps for detecting anatomical components in images, the steps comprising:
(i) receiving a medical image;
(ii) detecting at least one anchor landmark in the image by applying an anchor landmark detector that is learned from a first set of training samples;
(iii) detecting at least one bundle landmark in the image based at least in part on a position of the anchor landmark, wherein the bundle landmark is detected by applying a bundle landmark detector that is learned from a second set of training samples; and
(iv) detecting at least one anatomical primitive based at least in part on at least two neighboring landmarks by applying an anatomical primitive detector that is learned from a third set of training samples, wherein the third set of training samples includes positive samples and negative samples, wherein the positive samples are extracted by sampling voxels located within a specific anatomical primitive and a voxel within the specific anatomical primitive is treated as an independent positive sample, wherein the negative samples are obtained by sampling remaining voxels in a local volume containing neighboring structures.

18. A system for detecting anatomical components in images, comprising:
a non-transitory memory device for storing computer readable program code;
a processor in communication with the memory device, the processor being operative with the computer readable program code to:
(i) receive a medical image;
(ii) detect at least one anchor landmark in the image by applying an anchor landmark detector that is learned from a first set of training samples; and
(iii) detect at least one bundle landmark in the image based at least in part on a position of the anchor landmark, wherein the bundle landmark is detected by applying a bundle landmark detector that is learned from a second set of training samples; and
(iv) detecting at least one anatomical primitive based at least in part on at least two neighboring landmarks by applying an anatomical primitive detector that is learned from a third set of training samples, wherein the positive samples are extracted by sampling voxels located within a specific anatomical primitive and a voxel within the specific anatomical primitive is treated as an independent positive sample, wherein the negative samples are obtained by sampling remaining voxels in a local volume containing neighboring structures.

* * * * *